(12) United States Patent
Wilson

(10) Patent No.: US 7,296,564 B2
(45) Date of Patent: Nov. 20, 2007

(54) FOOTBALL FIELD GRILLE

(75) Inventor: Douglas Wilson, 7738 NE. 57th St., Kansas City, MO (US) 64119

(73) Assignee: Douglas Wilson, Kansas City, MO (US)

( * ) Notice: Subject to any disclaimer, the term of this patent is extended or adjusted under 35 U.S.C. 154(b) by 0 days.

(21) Appl. No.: 10/818,936

(22) Filed: Apr. 5, 2004

(65) Prior Publication Data

US 2005/0217660 A1 Oct. 6, 2005

(51) Int. Cl.
*A47J 37/00* (2006.01)
*F24C 15/00* (2006.01)
*F24C 15/10* (2006.01)
*F23M 9/00* (2006.01)

(52) U.S. Cl. .................. 126/25 R; 126/37 B; 126/220; 126/37 R

(58) Field of Classification Search .............. 126/25 R, 126/1 R, 41 R, 9 R, 9 B, 39 B, 37 B, 37 R; D03/905, 273; D08/4, 5
See application file for complete search history.

(56) References Cited

U.S. PATENT DOCUMENTS

| 153,828 | A | * | 8/1874 | Settle | 2/328 |
| 559,743 | A | * | 5/1896 | Ormsby | 108/25 |
| 614,722 | A | * | 11/1898 | Isaacs | 312/227 |
| 701,782 | A | * | 6/1902 | White | 108/86 |
| 1,893,527 | A | * | 1/1933 | Shriver | 312/266 |
| 2,347,270 | A | * | 4/1944 | Larsson | 312/244 |
| 3,520,290 | A | * | 7/1970 | Winters | 126/25 R |
| 4,062,340 | A | * | 12/1977 | Huff | 126/25 R |
| 4,665,891 | A | * | 5/1987 | Nemec et al. | 126/25 R |
| 5,184,599 | A | | 2/1993 | Stuart | |
| D425,367 | S | * | 5/2000 | Cragg | D7/402 |
| 6,209,533 | B1 | | 4/2001 | Ganard | |
| 6,354,286 | B1 | * | 3/2002 | Davis | 126/276 |
| 6,606,986 | B2 | * | 8/2003 | Holland et al. | 126/25 R |
| 2002/0134368 | A1 | * | 9/2002 | Moshonas et al. | 126/21 A |
| 2002/0189603 | A1 | * | 12/2002 | Hsu | 126/25 R |
| 2003/0000516 | A1 | * | 1/2003 | Hsu et al. | 126/25 R |

* cited by examiner

*Primary Examiner*—Cheryl Tyler
*Assistant Examiner*—Michael J. Early
(74) *Attorney, Agent, or Firm*—Douglas Wilson

(57) ABSTRACT

A novel football field grille is disclosed. The novel football field grill includes a firebox; a retractable lid mounted on the firebox, capable of retracting from a first closed position to a second open position; a hollow goalpost, having a first end and a second end, the first end of the goalpost mounted on the retractable lid, and the second end of the hollow goalpost in fluid communication with the firebox when the retractable lid is in the first closed position; and a support leg, mounted to the firebox to engage a surface.

10 Claims, 3 Drawing Sheets

FOOTBALL FIELD GRILLE

FIELD OF THE INVENTION

The present invention is related to novelty grills, and in particular to a grille that is in the form of a football field.

BACKGROUND OF THE INVENTION

Grilling outdoors is one of the most popular means of cooking in the United States. Especially during warm months, and even during the cold months of football season, many people can be seen grilling, such as those who engage in "tailgating" at a sporting event such as a football game. Additionally, Americans have a passion for sporting events, enjoy novelty sports items, and enjoy decorating items with a sports motif.

U.S. Design Pat. No. D425,367 directed towards an ornamental design of a barbeque grille shaped like a football, with shelves on either side of the football, which resemble half of a football field.

U.S. Pat. No. 6,209,533 is directed towards a smoker chamber and a firebox. The smoker chamber defines a smoker interior, which is adapted for receiving food items for smoking, and includes an opening for providing access to the smoker interior. The firebox engages in fluid communication with the smoker interior so that smoke produced within the firebox can flow into the smoker interior for smoking the food items placed therein. Preferably, the firebox is sized and shaped so that it is insertable through the opening and into the smoker interior. In embodiments so configured, the firebox may be placed within the smoker interior, such as during shipping of the smoker grill, thereby allowing components of the grill to be stored and shipped in a container that is smaller than could otherwise be utilized.

U.S. Pat. No. 5,184,599 is directed towards a self-contained cooker and grill having quadrilateral doors with a separate cooking grate attached to each door. Closure of all doors provides a conventional barbecue type cooker or smoker with a full sized grate and a common area for support of solid fuels. The multiple door cooker allows the operator to vary cooking times and heating of four different cooking surfaces. Each door can be opened independently allowing the operator to access the immediate cooking surface without disrupting the remaining cooking surfaces. An upper grate is provided in a fixed, movable, or rotational arrangement for adaptation to various cooking requirement.

U.S. Patent Application No. 20020134368 is directed towards a barbeque grill capable of being conveniently transported to remote outdoor locations, which is shaped to resemble the design of a toolbox.

There is a need, however, for a football field grille that can satisfy the novelty desire of America's sports fans which closely resembles a football field having goalposts as vents. None of the above prior art references satisfy this need. It would therefore be advantageous if a football field grille existed that when closed, included the additional novelty of having the smoke from the grill travel through mock goalposts.

OBJECTS AND SUMMARY OF THE INVENTION

It is an object of the present invention to provide a football field grille for use by fans.

It is a further object of the present invention to provide a football field grille for use by fans having a firebox; a retractable lid mounted on the firebox, capable of retracting from a first closed position to a second open position; a hollow goalpost, having a first end and a second end, the first end of the goalpost mounted on the retractable lid, and the second end of the hollow goalpost in fluid communication with the firebox when the retractable lid is in the first closed position; and at least one support leg, mounted to the firebox to engage a surface.

It is yet a further object of the present invention to provide a football field grille for use by fans having a firebox; a retractable lid mounted on the firebox, having a first half and a second half, capable of retracting from a first closed position to a second open position; a first set of hinges having first ends and second ends, and a second set of hinges having first ends and second ends, wherein the first ends of the first set of hinges are pivotally attached to the firebox and the second ends of the first set of hinges are pivotally attached to the first half of the retractable lid, and the first ends of the second set of hinges are pivotally attached to the firebox and the second ends of the second set of hinges are pivotally attached to the second half of the retractable lid; a hollow goalpost, having a first end and a second end, the first end of the goalpost mounted on the retractable lid, and the second end of the hollow goalpost in fluid communication with the firebox when the retractable lid is in the first closed position; a grate for cooking food on, wherein the grate is exposed when the retractable lid is in the second open position; a bracket having a first end and a second end, wherein the first end of the bracket is removably mounted on the firebox and the second end of the bracket is adapted to secure the football field grille to an object; and a support leg, mounted to the firebox to engage a surface.

In accordance with a first aspect of the present, a novel football field grille is provided. The football field grille includes a firebox; a retractable lid mounted on the firebox, capable of retracting from a first closed position to a second open position; a hollow goalpost, having a first end and a second end, the first end of the goalpost mounted on the retractable lid, and the second end of the hollow goalpost in fluid communication with the firebox when the retractable lid is in the first closed position; and at least one support leg, mounted to the firebox to engage a surface.

In accordance with another aspect of the present invention, a novel football field grille is provided. The novel football field grill includes a firebox; a retractable lid mounted on the firebox, having a first half and a second half, capable of retracting from a first closed position to a second open position; a first set of hinges having first ends and second ends, and a second set of hinges having first ends and second ends, wherein the first ends of the first set of hinges are pivotally attached to the firebox and the second ends of the first set of hinges are pivotally attached to the first half of the retractable lid, and the first ends of the second set of hinges are pivotally attached to the firebox and the second ends of the second set of hinges are pivotally attached to the second half of the retractable lid; a hollow goalpost, having a first end and a second end, the first end of the goalpost mounted on the retractable lid, and the second end of the hollow goalpost in fluid communication with the firebox when the retractable lid is in the first closed position; a grate for cooking food on, wherein the grate is exposed when the retractable lid is in the second open position; a bracket having a first end and a second end, wherein the first end of the bracket is removably mounted on the firebox and the second end of the bracket is adapted to secure the football field grille to an object; and a support leg, mounted to the firebox to engage a surface.

BRIEF DESCRIPTION OF THE DRAWINGS

The foregoing summary, as well as the following detailed description of a preferred embodiment of the present invention will be better understood when read with reference to the appended drawings, wherein.

DETAILED DESCRIPTION OF THE PREFERRED EMBODIMENT

Figure 1:
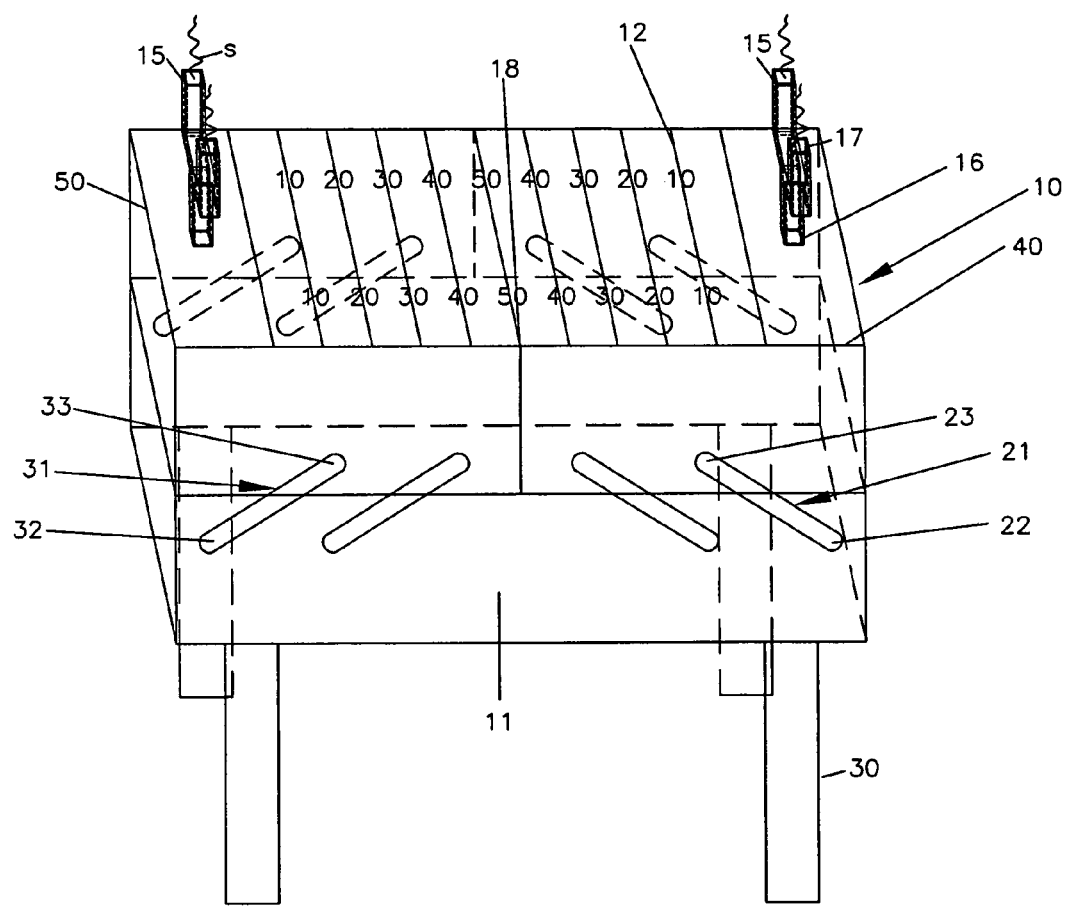
FIG. 1 is a perspective view of a football field grille in accordance with the present invention in a closed position.
Figure 2:
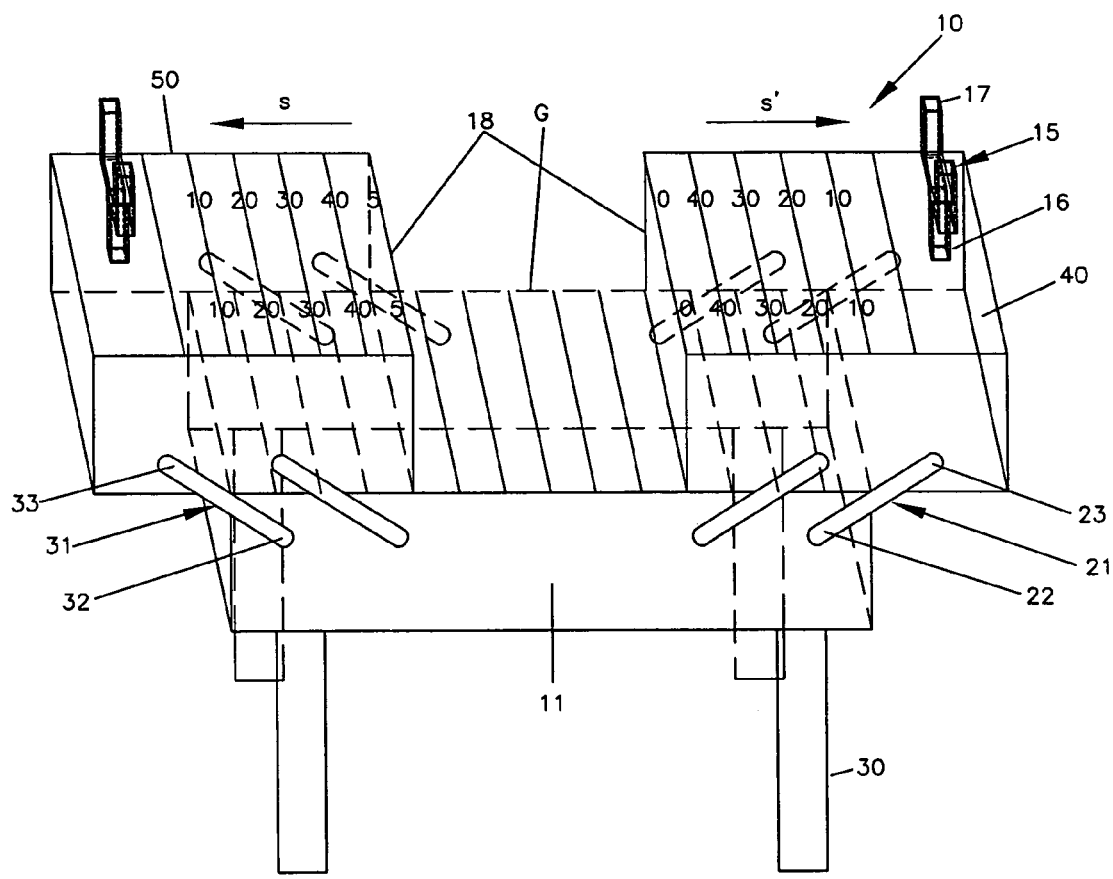
FIG. 2 is a perspective view of the football field grille of FIG. 1 shown in an open position.

Referring now to the drawings, wherein like reference numerals refer to the same components across the several views and in particular to FIGS. 1 and 2, there is shown a football field grille 10. The football field grille 10 includes a firebox 11 and a retractable lid 12, and support legs 30.

The firebox 11 includes the support legs 30 attached to the bottom of the firebox 11 to support the firebox 11 on a surface. Also attached to the firebox 11 are a first set of hinged scissor links 21. The first set of hinged scissor links 21 have first ends 22 and second ends 23. The first ends 22 of the first set of hinged scissor links 21 are pivotally mounted on the firebox 11. A second set of hinged scissor links 31 include first ends 32 and second ends 33. The first ends 32 of the second set of hinged scissor links 31 are likewise pivotally mounted on the firebox 11. In a preferred embodiment of the present invention, four support legs 30 are employed, however, any number of support legs 30 known to one of ordinary skill in the art may be used, including only one support leg 30.

The retractable lid 12 includes a first half 40 and a second half 50. A seam 18 separates the first half 40 of the retractable lid 12 from the second half 50 of the retractable lid 12. The second ends 23 of the first set of hinged scissor links 21 are pivotally mounted on the first half 40 of the retractable lid 12, hingedly attaching the first half 40 of the retractable lid 12 to the firebox 11. The second ends 33 of the second set of hinged scissor links 31 are pivotally mounted on the second half 50 of the retractable lid 12, hingedly attaching the second half 50 of the retractable lid 12 to the firebox 11. Mounted on the top of the first half 40 and second half 50 of the retractable lid 12 are goalposts 15. The goalposts 15 include a first end 16 and a second end 17. Both the first end 16 and the second end 17 of the goalposts 15 are open such that the first end 16 and the second end 17 are in fluid communication with each other. The first ends 16 of the goalposts 15 are mounted on the top of the retractable lid 12, such that the open second end 17 is in fluid communication with the interior of the football field grille 10 when the retractable lid 12 is in the closed position. During cooking, this provides that smoke 'S' will flow into the first ends 16 and out of the second ends 17 of the goalposts 15, producing a desired novel appearance of smoke coming out of the top of the goalposts 15.

Referring now to FIG. 2, the football field grille 10 is shown with the retractable lid 12 in the open position. This is achieved by sliding the first half 40 of the rectractable lid 12 in the direction of the arrow S, and the by sliding the second half 50 of the retractable lid 12 in the direction of the arrow S', separating the first half 40 of the retractable lid 12 from the second half 50 of the retractable lid 12 at a common seam 18. As shown in FIG. 2, this exposes the grill G for cooking. As the first half 40 of the retractable lid 12 is slid in the direction of the arrow S, the first set of hinged scissor links 21 pivot about their first ends 22 and second ends 23 to maintain the connection of the first half 40 of the retractable lid 12 to the firebox 11. Likewise, as the second half 50 of the retractable lid 12 is slid in the direction of the arrow S', the second set of hinged scissor links 31 pivot about their first ends 32 and second ends 33 to maintain the connection of the second half 50 of the retractable lid 12 to the firebox 11.

Figure 3:
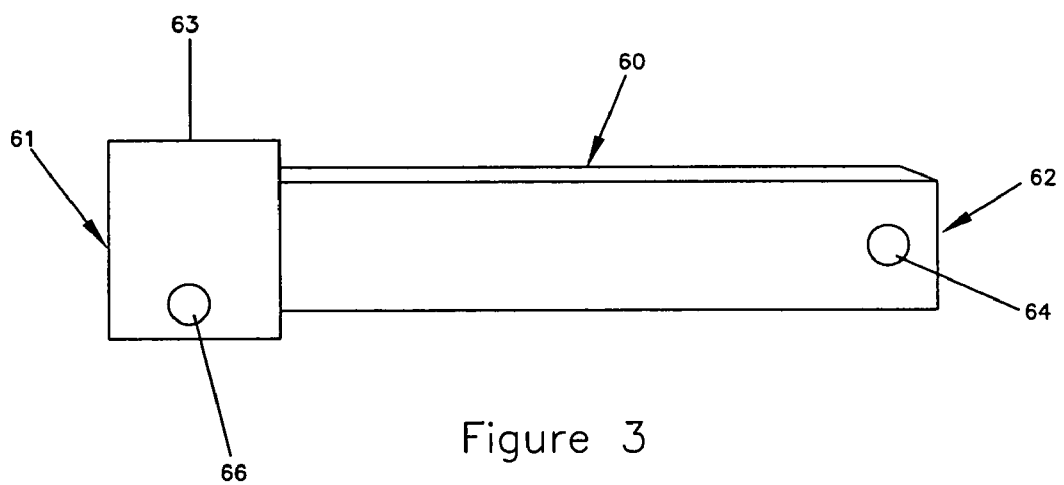
FIG. 3 is a top plan view of a bracket in accordance with the present invention.

Referring now to FIG. 3, a bracket 60 may also be provided to secure the football field grille 10 to an object such as a vehicle. The bracket 60 has a first end 61 and a second end 62. The first end 61 of the bracket 60 includes a mount 63 for attachment to the firebox 11 of the football field grille 10. The second end 62 of the bracket 60 includes a mount 64 adapted to attach to the object such as the vehicle. In a preferred embodiment of the present invention, the mount 64 on the second end 62 of the bracket 60 includes a hole to slide into a hitch of the vehicle. The mount 63 at the first end 62 of the bracket 60 includes a hole 66 to secure the football field grille 10 to the bracket 60 and another hole (not shown) to receive the football field grille 10.

In view of the foregoing disclosure, some advantages of the present invention can be seen. For example, a novel football field grille is disclosed. The novel football field grille is in the shape of a football field and has goalposts on the top so that smoke can come out of the goalposts when the grille is closed. This invention satisfies the desire of Americans to grill as well as incorporating Americans passion for sports such as football. The grille is easy to transport and has easy an easy to open close lid.

While the preferred embodiment of the present invention has been described and illustrated, modifications may be made by one of ordinary skill in the art without departing from the scope and spirit of the invention as defined in the appended claims. For example, in a preferred embodiment of the present invention, the grille would use charcoal or propane, however, any fuel known to one of ordinary skill in the art may be used. Furthermore, in a preferred embodiment of the present invention, the bracket described is a square tube, however any known shape to one of ordinary skill in the art may be employed to form the bracket. The material from which the football field grille is made in a preferred embodiment of the present invention is metal, however, any material known to one of ordinary skill in the art that would allow the football field grille to function as a grille may be employed.

What is claimed is:

1. A football field grille, comprising: a firebox; a retractable lid mounted on the firebox, capable of retracting from a first closed position to a second open position; a plurality of hinged scissor links affixed to the front and back sides of the grill which allow the grill to be opened laterally in an arcuate motion; at least one hollow goalpost, having a first end and a second end, the first end of the goalpost mounted on the retractable lid, and the second end of the hollow goalpost in fluid communication with the firebox when the retractable lid is in the first closed position; said at least one goalpost comprises a hollow post affixed to the top of a lid, a hollow crossbar perpendicularly affixed to the top of the post and two additional hollow upright posts mounted at opposite ends of the crossbar, said two additional posts being perpendicular to the crossbar and parallel to the post that is affixed to the lid; and at least one support leg, mounted to the firebox to engage a surface.

2. The football field grille of claim 1, wherein the retractable lid further comprises a first half and a second half.

3. The football field grille of claim 2, wherein the hinged scissor links consist of a first set of scissor links having first ends and second ends, and a second set of scissor links having first ends and second ends, wherein the first ends of the first set of hinged scissor links are pivotally attached to the firebox and the second ends of the first set of hinged scissor links are pivotally attached to the first half of the retractable lid, and the first ends of the second set of hinged scissor links are pivotally attached to the firebox and the second ends of the second set of hinged scissor links are pivotally attached to the second half of the retractable lid.

4. The football field grille of claim 3, wherein smoke from the football field grille is communicated through the hollow goalposts when the retractable lid is in the first closed position.

5. The football field grille of claim 1, further comprising a bracket having a first end and a second end, wherein the first end of the bracket is removably mounted on the firebox and the second end of the bracket is adapted to secure the football field grille to an object.

6. The football field grille of claim 5, wherein the object is a vehicle and the second end of the bracket is removably attached to the vehicle.

7. The football field grille of claim 1, further comprising a grate for cooking food on.

8. The football field grille of claim 7, wherein the grate is exposed when the retractable lid is in the second open position.

9. The football field grille of claim 1, further comprising three additional support legs mounted to the firebox to engage the surface.

10. A football field grille, comprising:

a firebox;

a retractable lid mounted on the firebox, having a first half and a second half, capable of retracting from a first closed position to a second open position;

a first set of hinged scissor links having first ends and second ends, and a second set of hinged scissor links having first ends and second ends, wherein the first ends of the first set of hinged scissor links are pivotally attached to the firebox and the second ends of the first set of hinged scissor links are pivotally attached to the first half of the retractable lid, and the first ends of the second set of hinged scissor links are pivotally attached to the firebox and the second ends of the second set of hinged scissor links are pivotally attached to the second half of the retractable lid;

two hollow goalposts, each having a first end and a second end, the first end of the goalpost mounted on the retractable lid, and the second end of the hollow goalpost in fluid communication with the firebox when the retractable lid is in the first closed position;

said goalposts each comprising a hollow post affixed to the top of a lid, a hollow crossbar perpendicularly affixed to the top of the post and two additional hollow upright posts mounted at opposite ends of the crossbar, said additional posts being perpendicular to the crossbar and parallel to the post that is affixed to the lid;

a grate for cooking food on, wherein the grate is exposed when the retractable lid is in the second open position;

a bracket having a first end and a second end, wherein the first end of the bracket is removably mounted on the firebox and the second end of the bracket is adapted to secure the football field grille to an object; and a support leg, mounted to the firebox to engage a surface.

\* \* \* \* \*